US012219420B2

(12) United States Patent
Reeves

(10) Patent No.: US 12,219,420 B2
(45) Date of Patent: Feb. 4, 2025

(54) DYNAMICALLY ADJUSTING A SERVICE PLAN PROVIDED TO A UE BY A WIRELESS TELECOMMUNICATION NETWORK

(71) Applicant: T-Mobile USA, Inc., Bellevue, WA (US)

(72) Inventor: Raymond E. Reeves, Orlando, FL (US)

(73) Assignee: T-Mobile USA, Inc., Bellevue, WA (US)

( * ) Notice: Subject to any disclaimer, the term of this patent is extended or adjusted under 35 U.S.C. 154(b) by 509 days.

(21) Appl. No.: 17/692,001

(22) Filed: Mar. 10, 2022

(65) Prior Publication Data

US 2023/0292206 A1    Sep. 14, 2023

(51) Int. Cl.
*H04W 36/30* (2009.01)
*H04W 36/00* (2009.01)
*H04W 36/32* (2009.01)

(52) U.S. Cl.
CPC ....... *H04W 36/30* (2013.01); *H04W 36/0058* (2018.08); *H04W 36/00837* (2018.08); *H04W 36/32* (2013.01)

(58) Field of Classification Search
CPC .............................. H04W 36/30; H04W 74/12
USPC ........................................................ 370/329
See application file for complete search history.

(56) References Cited

U.S. PATENT DOCUMENTS

| | | | |
|---|---|---|---|
| 6,091,954 A | 7/2000 | Haartsen et al. | |
| 6,937,869 B1 | 8/2005 | Rayburn | |
| 7,809,360 B2 | 10/2010 | Agrawal et al. | |
| 7,957,394 B1 | 6/2011 | Cohen et al. | |
| 7,986,936 B2 | 7/2011 | Zulager et al. | |
| 8,000,688 B2 | 8/2011 | Aaron | |
| 8,046,765 B2 | 10/2011 | Cherkasova et al. | |
| 8,078,181 B2 | 12/2011 | Annunziato et al. | |
| 8,249,552 B1 | 8/2012 | Gailloux et al. | |
| 8,315,594 B1 | 11/2012 | Mauser et al. | |
| 8,392,927 B2 | 3/2013 | Rolia et al. | |
| 8,402,111 B2 | 3/2013 | Raleigh | |
| 8,452,768 B2 | 5/2013 | Shanbhag | |
| 8,493,876 B2 | 7/2013 | Zhu et al. | |
| 8,509,811 B2 | 8/2013 | Phillips | |
| 8,588,736 B2 | 11/2013 | Gorman et al. | |
| 8,611,850 B1 | 12/2013 | Gailloux et al. | |

(Continued)

FOREIGN PATENT DOCUMENTS

| | | |
|---|---|---|
| CN | 102523590 B | 7/2014 |
| CN | 103298003 B | 3/2016 |

(Continued)

*Primary Examiner* — Angel T Brockman
(74) *Attorney, Agent, or Firm* — Perkins Coie LLP

(57) ABSTRACT

The system obtains an event report identifying a UE, and a location of the UE. The system obtains a primary service plan provided to the UE, and a second service plan, where the second service plan is available to the UE at the location of the UE. The system obtains a first measurement of a parameter indicating a first QoS provided to the UE, and a second measurement of the parameter indicating a second QoS provided to multiple UEs, where the multiple UEs are proximate to the UE. The system compares the first and the second measurement to determine whether the first QoS is lower than the second QoS. Upon determining that the first QoS is lower, the system confirms that the second service plan is likely to improve the QoS. Upon confirming, the system sends a request to change the primary service plan to the second service plan.

20 Claims, 8 Drawing Sheets

(56) References Cited

U.S. PATENT DOCUMENTS

| | | |
|---|---|---|
| 8,913,987 B2 | 12/2014 | Lee et al. |
| 8,924,543 B2 | 12/2014 | Raleigh et al. |
| 8,965,367 B1 | 2/2015 | Bartlett et al. |
| 9,161,200 B2 | 10/2015 | Guday et al. |
| 9,497,611 B2 | 11/2016 | Mcnamee et al. |
| 9,565,318 B2 | 2/2017 | Tapia et al. |
| 9,565,570 B2 | 2/2017 | Zhang et al. |
| 9,622,124 B2 | 4/2017 | Hamilton et al. |
| 9,858,559 B2 | 1/2018 | Raleigh et al. |
| 9,900,443 B2 | 2/2018 | Pattabiraman et al. |
| 9,927,808 B2 | 3/2018 | Wänstedt et al. |
| 10,193,943 B2 | 1/2019 | Lau et al. |
| 10,331,485 B2 | 6/2019 | Sanjabi et al. |
| 10,547,750 B2 | 1/2020 | White |
| 10,715,996 B1 | 7/2020 | Singh et al. |
| 10,778,849 B2 | 9/2020 | Dempster et al. |
| 11,082,565 B2 | 8/2021 | Caldwell et al. |
| 2005/0220280 A1 | 10/2005 | Steinberg |
| 2006/0141983 A1 | 6/2006 | Jagannathan et al. |
| 2006/0143027 A1 | 6/2006 | Jagannathan et al. |
| 2007/0118416 A1 | 5/2007 | Hendren |
| 2007/0143775 A1 | 6/2007 | Savoor et al. |
| 2007/0277113 A1 | 11/2007 | Agrawal et al. |
| 2008/0306798 A1 | 12/2008 | Anke et al. |
| 2011/0177811 A1 | 7/2011 | Heckman et al. |
| 2012/0253882 A1 | 10/2012 | Mohan et al. |
| 2013/0196647 A1 | 8/2013 | Raleigh et al. |
| 2017/0118101 A1 | 4/2017 | Veron et al. |
| 2017/0163821 A1 | 6/2017 | Payette et al. |
| 2017/0169458 A1 | 6/2017 | Singh |
| 2019/0053114 A1 | 2/2019 | Karimli et al. |
| 2021/0103294 A1 | 4/2021 | Mahkonen et al. |

FOREIGN PATENT DOCUMENTS

| | | |
|---|---|---|
| CN | 104205934 B | 11/2019 |
| CN | 113593234 A | 11/2021 |
| EP | 2391952 A1 | 12/2011 |
| EP | 1652400 B1 | 7/2012 |
| EP | 2510725 A1 | 10/2012 |
| EP | 2302926 B1 | 11/2014 |
| EP | 2365713 B1 | 1/2017 |
| EP | 3207762 A1 | 8/2017 |
| EP | 2622503 B1 | 11/2018 |
| EP | 2614446 B1 | 6/2021 |
| EP | 3389221 B1 | 11/2021 |
| JP | 2001043199 A | 2/2001 |
| JP | 2004274745 A | 9/2004 |
| JP | 2007213283 A | 8/2007 |
| JP | 2007213284 A | 8/2007 |
| JP | 4655926 B2 | 1/2011 |
| JP | 2011200692 A | 10/2011 |
| JP | 5414730 B2 | 2/2014 |
| JP | 5922691 B2 | 4/2016 |
| JP | 2020190990 A | 11/2020 |
| JP | 2021041562 A | 3/2021 |
| KR | 20080005017 A | 1/2008 |
| KR | 100976135 B1 | 8/2010 |
| KR | 20120000311 A | 1/2012 |
| KR | 101211259 B1 | 12/2012 |
| KR | 101213120 B1 | 12/2012 |
| KR | 20140012826 A | 2/2014 |
| KR | 20150083673 A | 7/2015 |
| KR | 101631630 B1 | 6/2016 |
| KR | 20190116187 A | 10/2019 |
| KR | 102151870 B1 | 9/2020 |
| WO | 2014071974 A1 | 5/2014 |
| WO | 2017205463 A1 | 11/2017 |
| WO | 2018224122 A1 | 12/2018 |
| WO | 2019016389 A1 | 1/2019 |
| WO | 2020086557 A1 | 4/2020 |
| WO | 2020172491 A1 | 8/2020 |
| WO | 2020195440 A1 | 10/2020 |
| WO | 2020227435 A1 | 11/2020 |
| WO | 2020253067 A1 | 12/2020 |
| WO | 2021031665 A1 | 2/2021 |

DYNAMICALLY ADJUSTING A SERVICE PLAN PROVIDED TO A UE BY A WIRELESS TELECOMMUNICATION NETWORK

BACKGROUND

A service plan is a package of services offered by a wireless telecommunication network that includes the activation, monthly charges, per-minute airtime charges, roaming terms, and local service area, as well as additional services (such as voicemail, data, or international roaming). A mobile device can subscribe to a particular service plan.

BRIEF DESCRIPTION OF THE DRAWINGS

Detailed descriptions of implementations of the present invention will be described and explained through the use of the accompanying drawings.

Figure 1:
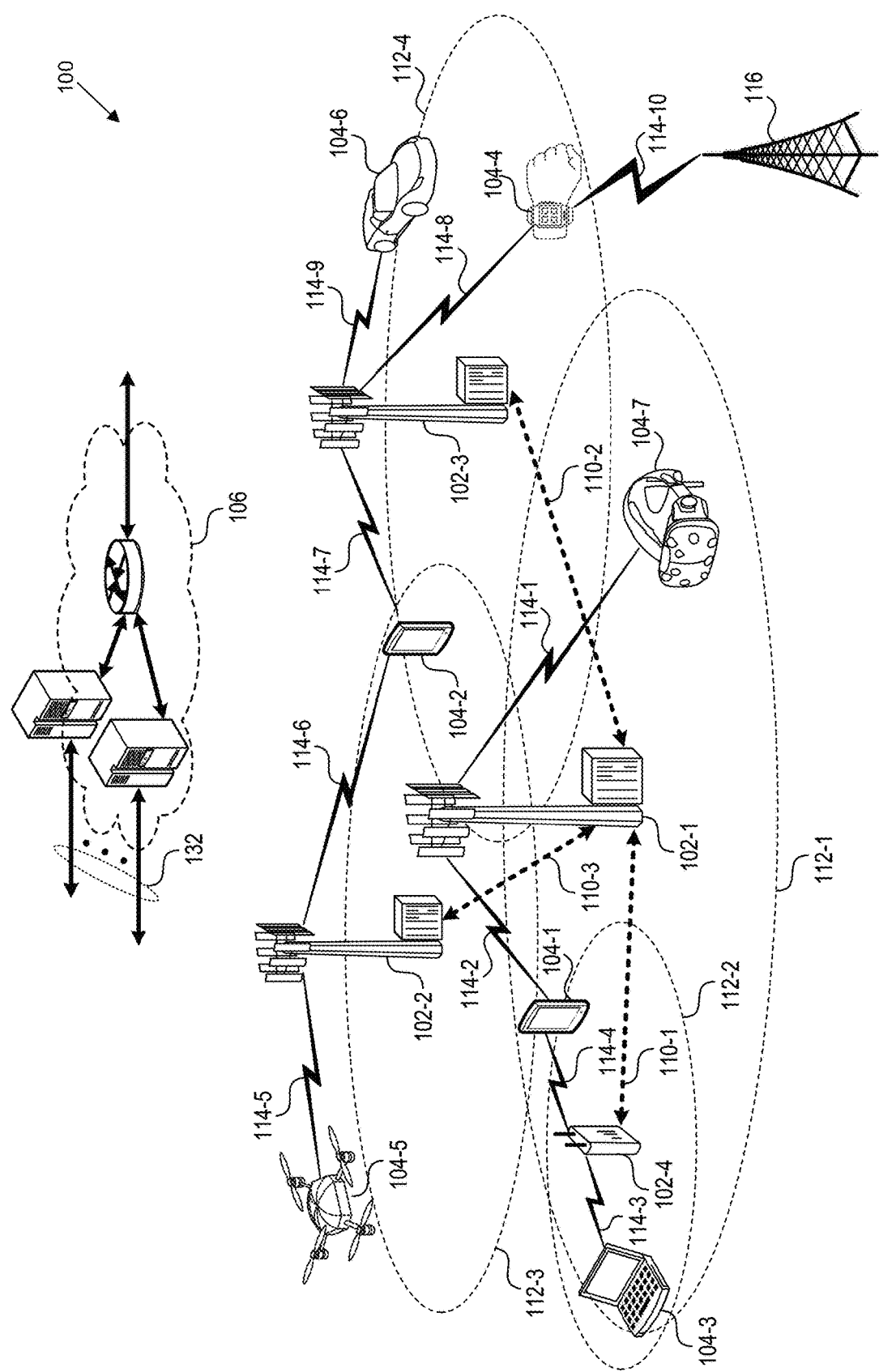
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to dynamically adjust a primary service plan provided to a mobile device by a wireless telecommunication network. The system obtains data, such as an event report, where the event report identifies the mobile device and indicates a location of the mobile device. The system obtains an indication of a primary service plan provided to the mobile device by the wireless telecommunication network, and an indication of another service plan, where the other service plan is available to the mobile device at the location of the mobile device.

The system can obtain a measurement of at least one parameter indicating a quality of service (QoS) provided to the mobile device by the wireless telecommunication network through the primary service plan. The parameter can include measurement reports, session completion reports, carrier aggregation, signal to interference and noise radio (SINR), LTE coverage, 5G coverage, frequency division duplex (FDD)/time division duplex (TDD) 5G carrier aggregation, average download speed, etc. The system can obtain a second measurement of the parameter indicating a quality of service provided to multiple mobile devices by the wireless telecommunication network, where the multiple mobile devices are proximate to the mobile device, such as within a 100-meter radius.

The system can obtain an indication of one or more service plans provided to the multiple mobile devices by the wireless telecommunication network. The system can compare the measurements of the parameter to determine whether the comparison indicates that the quality of service offered to the mobile device is lower than the quality of service offered to the multiple mobile devices. Upon determining that the quality of service offered to the mobile device is lower than the quality of service offered to the multiple mobile devices, the system can determine whether the primary service plan is different from the one or more service plans provided to the multiple mobile devices by the wireless telecommunication network. Upon determining that the primary service plan is different from the one or more service plans provided to the multiple mobile devices, the system can determine whether the other service plan is likely to provide better quality of service than the primary service plan. Upon determining that the other service plan is likely to provide better quality of service than the primary service plan, the system can send a request to change the primary service plan to the other service plan.

For example, the mobile device can have service plan A when the mobile device is located in Manhattan, where the mobile device spends most of its time, however, when the mobile device is in New Jersey, plan A may not provide the desired quality of service. The system can determine that the multiple mobile devices using a New Jersey plan have better quality of service then the mobile device. Based on the difference in the quality of service, and the difference in plans, the system can change the Manhattan plan of the mobile device to the New Jersey plan so that the mobile device can receive better quality of service.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WVAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL)

transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
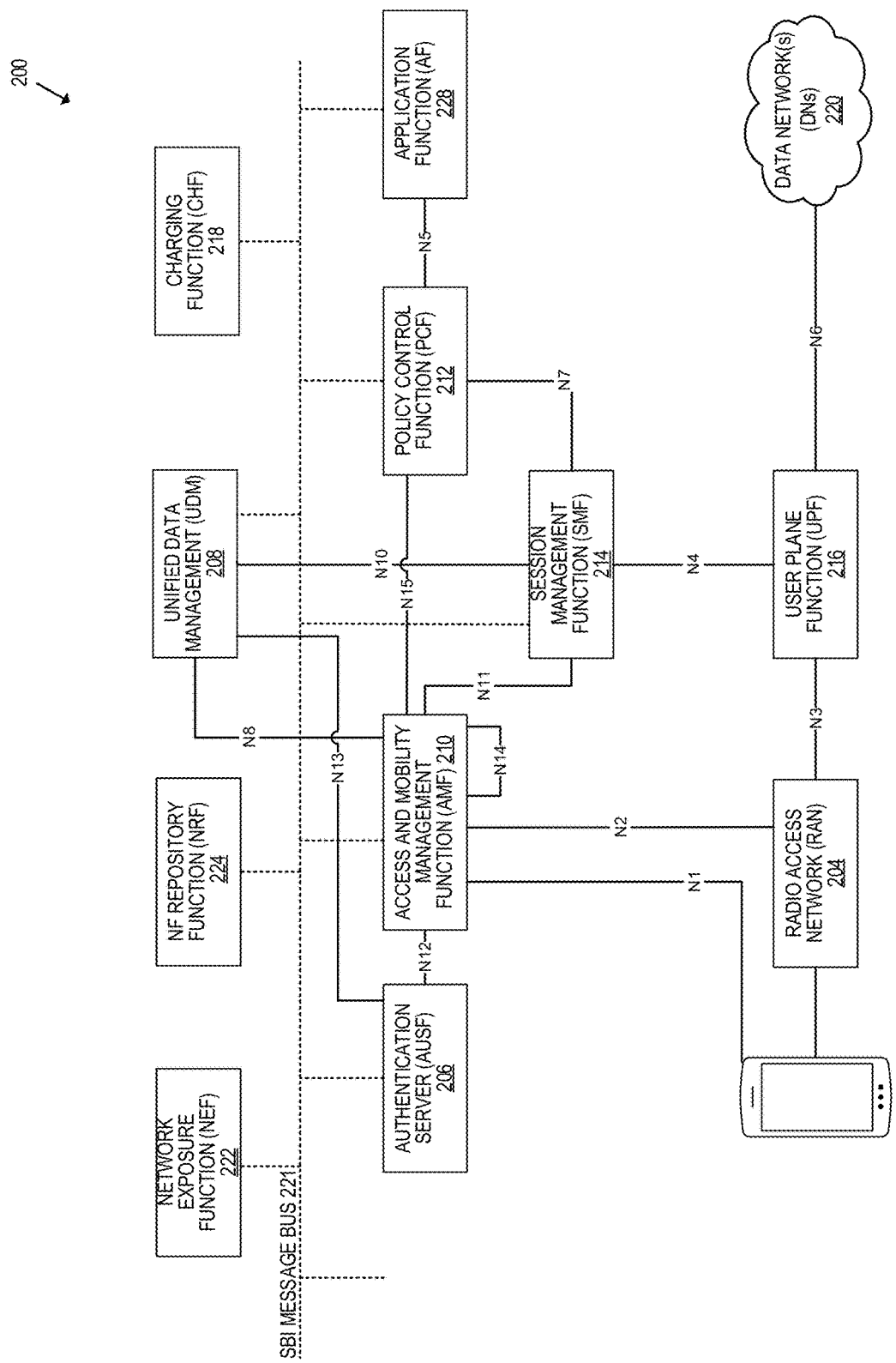
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a Radio Access Network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP technical specification (TS) 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), serving to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical quality of service and charging rules, includes network slice selection, which is regulated by the NSSF 226.

Figure 3:
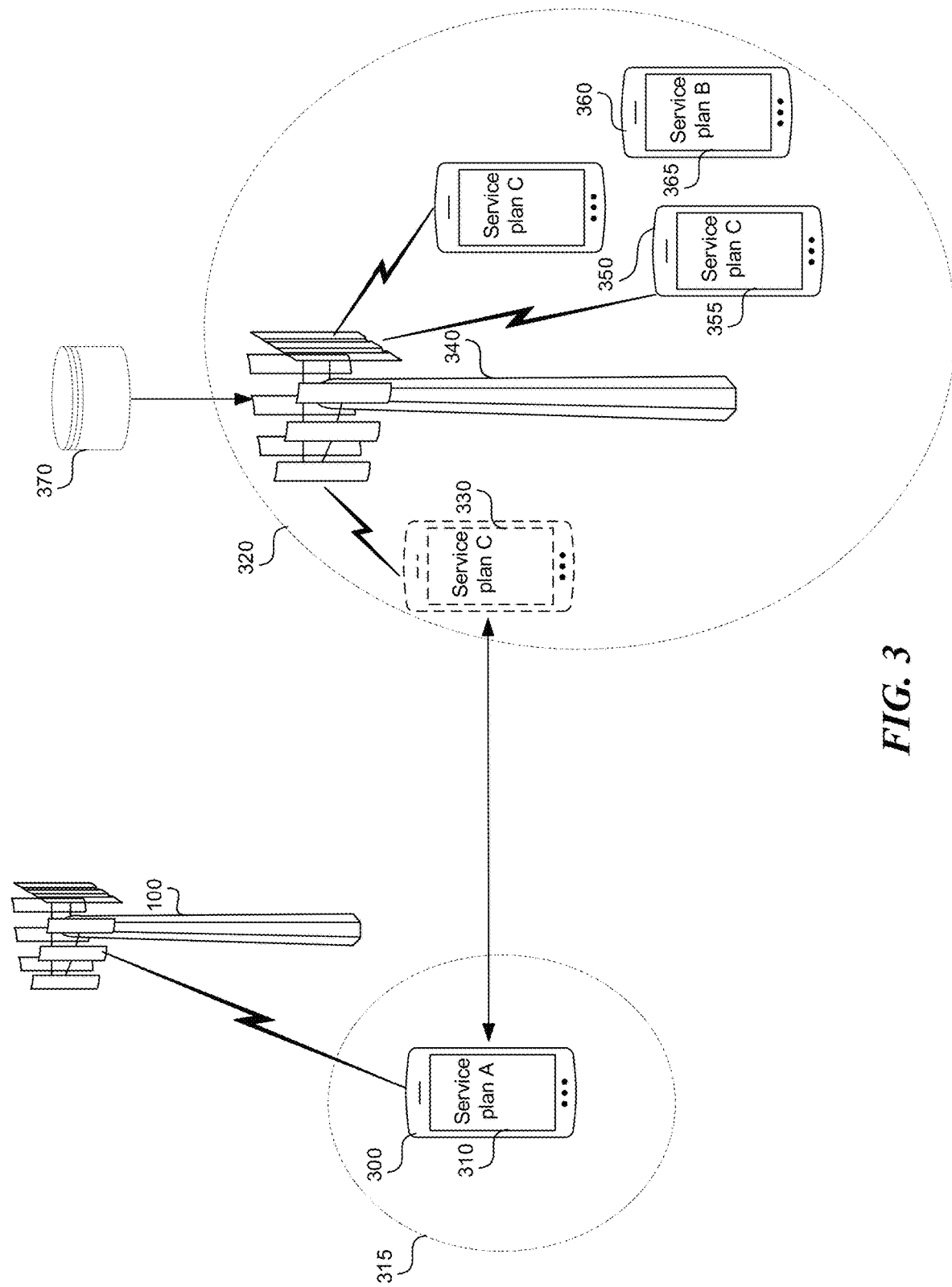
FIG. 3 shows a system to adjust a service plan provided to a user equipment (UE) based on the location of the UE.

Dynamically Adjusting a Service Plan Provided to a UE by a Wireless Telecommunication Network FIG. 3 shows a system to adjust a service plan provided to a UE based on the location of the UE. The network 100 can provide wireless coverage to the UE 300 according to a service plan 310. The service plan 310 can include how much data bandwidth the UE 300 can use per month, how much streaming the UE can use per month, a set of network components 100 that can serve the UE, such as a set of cell towers, price of the plan, included discounts, locations where streaming is free, which network to use when roaming, etc.

For example, if the UE 300 is 5G capable, but subscribes only to a 4G plan, the service plan 310 can indicate to only use 4G infrastructure to provide coverage to the UE. The service plan 310 can include which roaming network the UE 300 can connect to when out of range of the network 100. The roaming networks can provide varying levels of service at varying levels of cost. The service plan can also indicate whether a dedicated infrastructure layer should serve the UE 300. For example, if the UE 300 belongs to a law enforcement user, the network 100 can provide coverage to the UE using infrastructure dedicated to serving law enforcement personnel. If law enforcement personnel are not using all the capacity of the dedicated infrastructure, the network 100 can connect the UE 300 to the law enforcement infrastructure even though the UE does not belong to a law enforcement user. If law enforcement personnel need all the dedicated infrastructure, the network 100 can remove the UE 300 from the dedicated infrastructure.

The service plan 310 can be the primary plan of the UE 300, meaning that the user of the UE has subscribed to the service plan 310. The service plan 310 can provide good coverage to the UE 300 in places 315 where the UE is most frequently located, such as home or work. However, when the UE 300 goes to a different area 320, the service plan 310 may not provide sufficiently good quality of service. The network 100 can measure the quality of service provided to the UE 300, and based on the measurement can determine to change the service plan 310 to service plan 330. For example, the UE 300 can have service plan A when the UE is located in Manhattan, e.g., location 315, where the UE spends most of its time, however, when the UE is in New Jersey, e.g., location 320, plan A may not provide the desired quality of service.

When the UE 300 moves to location 320, the network 100 can connect the UE to a nearby cell tower 340. The cell tower 340 can belong to the network 100, or can be a part of a different network, namely a roaming network. The network 100 can monitor the quality of service provided to the UE 300 by monitoring measurements of various parameters indicating the qualities of service provided to the UE. The parameters can include signal strength at the UE 300, signal to interference and noise ratio (SINR), carrier aggregation, download speed, upload speed, throughput up/down before/after hand off (HO), percentage of time and tonnage on 5G vs. 4G connections, Block Error Rate (BLER), Channel Quality Indicator (CQI) per call segment reported, available power headroom, Voice over IP (VoIP) quality perceived, Voice over 5G NR (VoNR) quality reported, etc.

At the new location 320, the network 100 can also monitor the quality of service provided to other UEs 350, 360 (only two labeled for brevity) that are close to the UE 300 and are being served by the same cell tower 340. The UEs 300, 350, 360 can be within four miles of each other. The network 100 can obtain measurements of the same various parameters for the UEs 350, 360. The network 100 can compare the parameter measurements for the UE 300 and the UEs 350, 360 to determine whether the quality of service provided to the UE 300 is lower than the quality of service provided to the UEs 350, 360.

If the network 100 determines that the quality of service provided to the UE 300 is lower than the quality of service provided to the UEs 350, 360, the network can determine the service plans 355, 365 provided to the UEs 350, 360. The UEs 350, 360 can have plans 355, 365, that are different from the plan 310. Plans 355, 365 can be the same plan. For example, the UE 300 can be in New Jersey, but using the Manhattan plan 310, while the UEs 350, 360 can be using their primary plan 355, 365, such as a New Jersey plan. Based on the difference in the quality of service, and the difference in plans, the network 100 can change the Manhattan plan 310 to the New Jersey plan 355 so that the UE 300 can receive better quality of service.

The network 100 can build a history associated with the quality of service of plans 310, 355, 365 at various locations 320. The network 100 can store the results of the various measurements associated with various plans and the location 320 in the database 370.

Figure 4A:
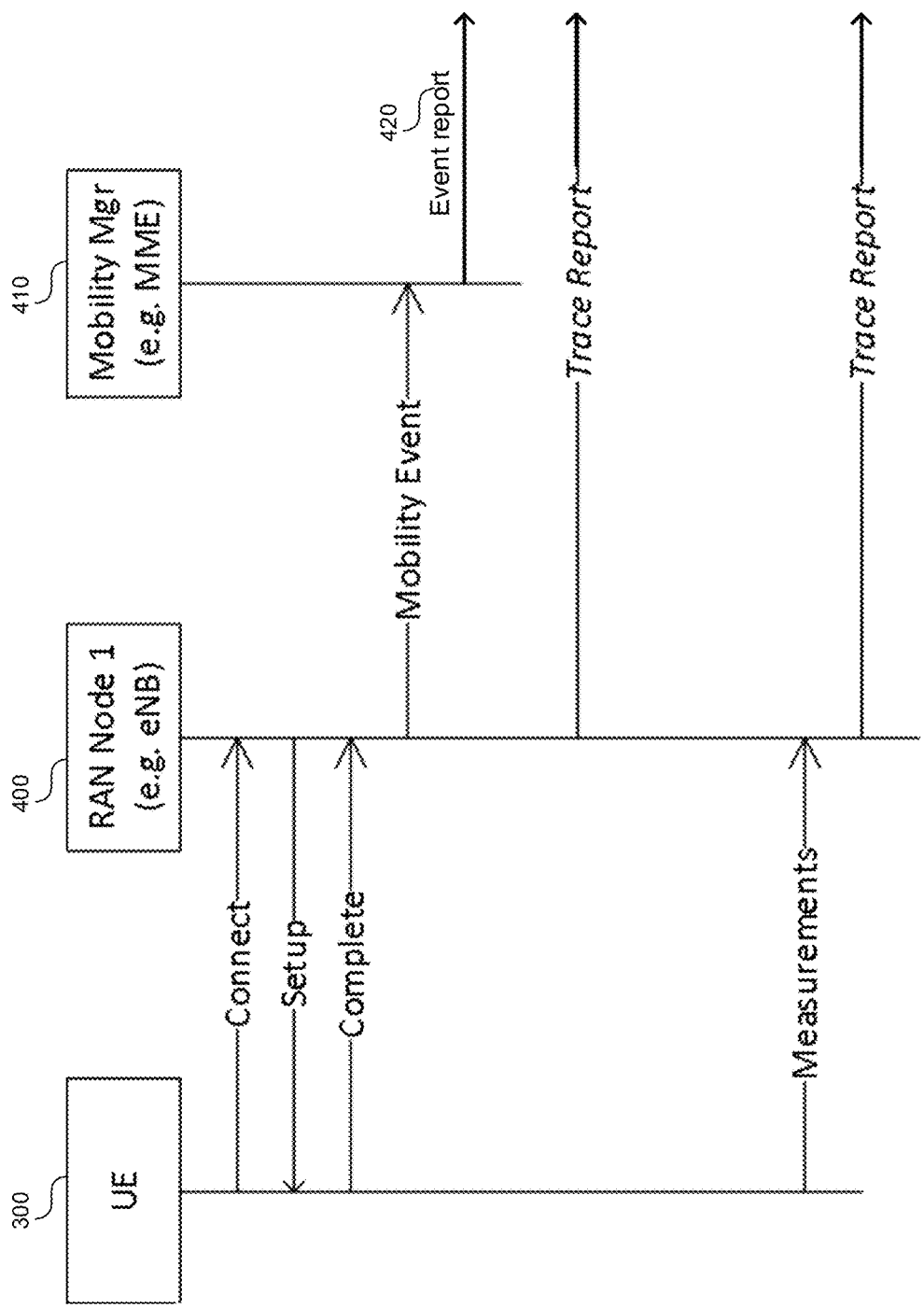
FIGS. 4A-4B show how components of the network can communicate with each other to determine whether to change the service plan for the UE.
Figure 4B:
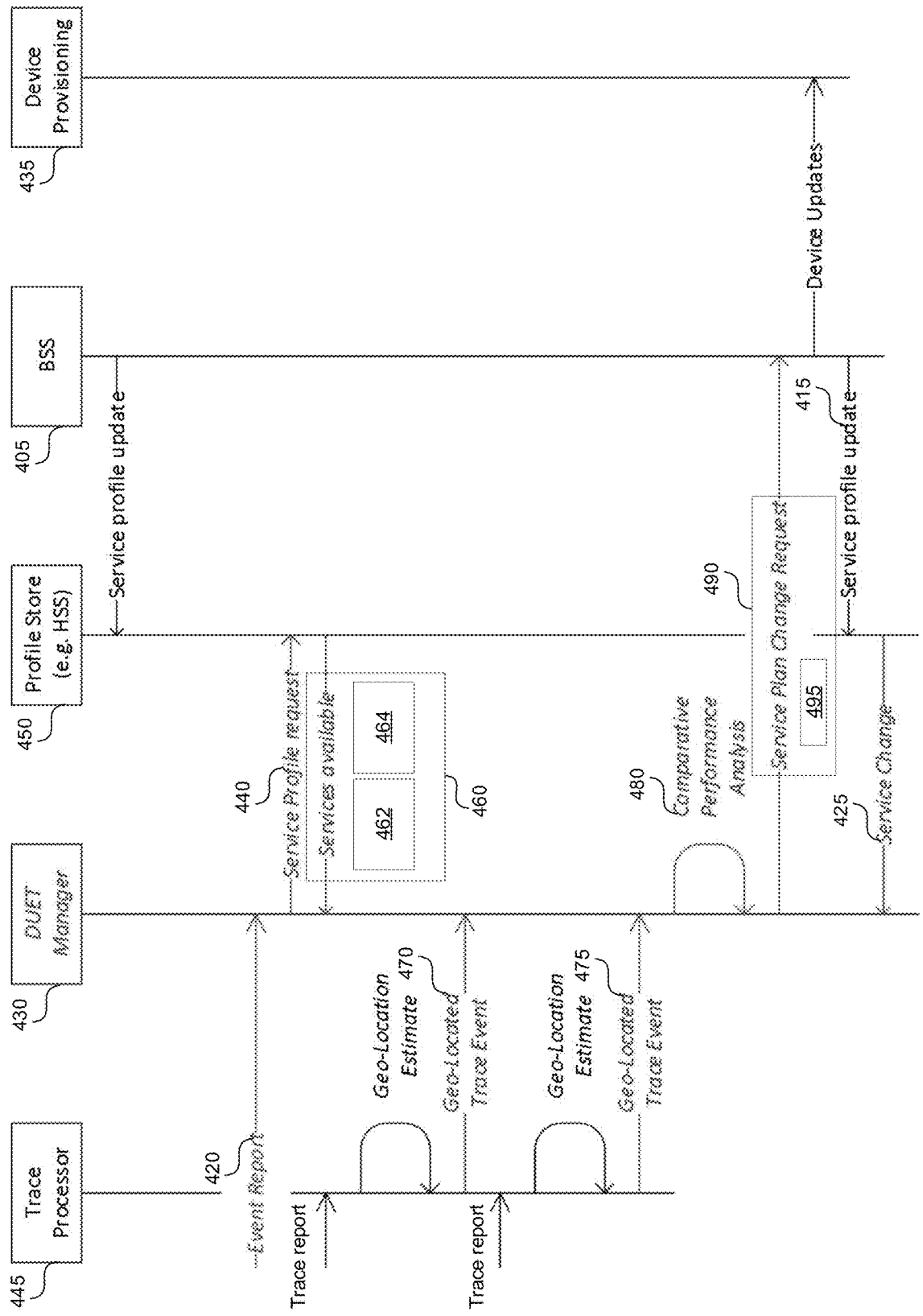

FIGS. 4A-4B show how components of the network 100 can communicate with each other to determine whether to change the service plan for the UE 300. The UE 300 can connect to a RAN 400. The RAN 400 is part of a telecommunications system that connects individual devices to other parts of a network through radio connections. The RAN 400 provides the connection between the UE 300 and the core network 100. The UE 300 can send various measurements of the quality of service, as described in this application, to the RAN 400.

The RAN 400 can communicate with the mobility management node 410. In 4G wireless generation networks, the node 410 can be mobility management entity (MME), or in 5G networks, the node 410 can be Access and Mobility Management Function (AMF). The node 410 manages UE access network and mobility, as well as establishing the bearer path for UEs. The node 410 is also concerned with the bearer activation/deactivation process. The node 410 is in charge of authenticating the user as well as generating and allocating temporary identities to UEs. The node 410 can receive an identifier of the UE 300 as well as the location of the UE from the RAN 400.

The node 410 can send an event report 420 to a node 430, Dynamic User Experience Tender (DUET) manager. The DUET manager 430 is not standard to network 100 in FIG. 1, and is used to coordinate switching between service plans 310, 355, 365 in FIG. 3. The event report 420 can contain the identifier of the UE 300 and a location of the UE. The location of the UE 300 may not be precise, and can be within 100 meters of the actual location of the UE. The DUET manager 430 can send a service profile request 440 to the profile store 450.

The profile store 450 is the master user database that supports the IP Multimedia Subsystem (IMS) network entities that handle the calls/sessions. The profile store 450 contains user profiles, performs authentication and authorization of the user, and can provide information about the physical location of the user. In 4G the profile store 450 can be the Home Subscriber Server (HSS), while in 5G the profile store 450 can include Authentication Server Function (AUSF) and Unified Data Management (UDM).

The profile store 450 can return services available 460 to the DUET manager 430. The services available 460 can include the service profile 462 as well as other available plans 464 for the UE 300 at the location 320 in FIG. 3. The service profile 462 can include the primary plan 310 in FIG. 3 of the UE 300, the technical capabilities of the UE, the name associated with the UE, the address associated with the UE, whether the UE has a static Internet Protocol (IP)

address, and if no static IP address, the last dynamic IP address of the UE. The network 100 can obtain the technical abilities of the UE 300 based on the Type Allocation Code (TAC). The TAC can uniquely identify the UE 300, and a particular model (and often revision) of the UE 300. Based on the model of the UE 300, the network 100 can determine the technical capabilities of the UE.

The profile store 450 can indicate in the available plans 464 that the DUET manager 430 has unlimited discretion in selecting the appropriate plan for the UE, or the profile store can indicate a limited list of available plans 464 from which the DUET manager 430 can choose. The profile store 450 can indicate the quality of service threshold that, when reached, authorizes the DUET manager 430 to change the service plan 310 in FIG. 3.

The other available plans 464 can depend on the technical capabilities of the UE 300, the primary plan 310 in FIG. 3 of the UE, and the location of the UE, as well as the user associated with the UE. The other available plans 464 can vary based on the type of the UE 300, the type of the primary plan 310, and/or the user of the UE. For example, the location of the UE 300 can dictate which plans are available at the location. Even if a particular plan is available, it may not be offered to the user depending on the technical capabilities of the UE 300, the primary plan 310, and the user associated with the UE. If the UE 300 is a high-value user, the available plans 464 can include a high-value plan, such as roaming on the most expensive roaming network, which would not be available to other UEs. If the primary plan 310 is not a high-value plan, the available plans 464 may not include the best available plans. Similarly, if the UE 300 is not capable of 5G service, the available plans 464 do not include 5G plans.

The available plans 464 can differ from the primary plan 310 in that they offer unlimited data, 5G service, and high-definition streaming, while the primary plan 310 offers only standard definition streaming. The available plans 464 can offer virtual private network (VPN) services if the UE 300 is at risk of attack, or if the user of the UE is a high-value customer. The available plans 464 can also include using a roaming network that provides best coverage at the location 320 in FIG. 3.

The DUET manager 430 can receive one or more geo-located trace events 470, 475 (only two shown in FIG. 4B for brevity) from the trace processor 445. The trace processor 445 can receive messages from the RAN 400 indicating a location of the UE 300, the tower to which the UE is connected, data usage associated with the UE, cellular network usage associated with the UE, etc. In addition, the trace processor can include information about signal strength at the UE 300, signal to interference and noise ratio (SINR), carrier aggregation, download speed, upload speed, throughput up/down before/after hand off (HO), percentage of time and tonnage on 5G vs. 4G connections, Block Error Rate (BLER), Channel Quality Indicator (CQI) per call segment reported, available power headroom, Voice over IP (VoIP) quality perceived, Voice over 5G NR (VoNR) quality reported, etc. The trace processor can include the above information based on individual interactions between the UE and the RAN as well as summaries that the RAN reports for each session. The geo-located trace events 470, 475 can inform the DUET manager 430 of a measurement of a parameter indicating a quality of service provided to the UE 300. The trace events 470, 475 can include measurement reports, call detail record (CDR), signal strength, average download speed, ENDC or 5G non-stand-alone tonnage, 5G tonnage (i.e. 5G data volume), 5G coverage, carrier aggre-gation, 5G carrier aggregation, etc. For clarification, CDR contains various attributes of the call, such as time, duration, completion status, source number, and destination number. Further, ENDC is an NSA 5G architecture that allows smartphones to access both 5G and 4G LTE networks at the same time.

The DUET manager 430 can compare the quality of service provided to the UE 300 to the quality of service provided to the other UEs 350, 360 in FIG. 3 in the area 320 in FIG. 3, by comparing the measured parameters. If the UE 300 has a lower quality of service than the UEs 350, 360, the DUET manager 430 can determine whether the UE 300 has a different plan than the UEs 350, 360. If so, the DUET manager 430 can record the observation in the database 370 in FIG. 3, thus building a history of quality of service measurements for various service plans 310, 355, 365 in FIG. 3 provided to the UEs 300, 350, 360, respectively.

The DUET manager 430 can perform comparative performance analysis 480 to determine, based on the history stored in the database 370, whether the underperformance of the plan 310 is statistically significant compared to the plans 355, 365. For example, the plan 310 can be a Manhattan plan because the UE 300 is usually located in Manhattan. The plans 355, 365 can be New Jersey plans. The DUET manager 430 can determine whether 90% or more of the UEs that have Manhattan plans are underperforming when they're in the area 320 in FIG. 3, compared to the 99% of UEs 350, 360 having New Jersey plans that are also in the area 320. Based on the frequency of occurrence of the underperformance, e.g., 90% or more in the above example, the DUET manager 430 can determine that the underperformance of the UE 300 is not an outlier, and is a statistically significant event.

The DUET manager 430 can determine whether the profile store 450 has authorized the DUET manager 430 to request a change in the plan based on the statistically significant event. For example, the DUET manager 430 can determine that 90% of the UEs that have Manhattan plans underperformed the New Jersey plans. However, the profile store 450 can authorize the DUET manager 430 to request the change in plan only when the statistically significant event exceeds 95% of Manhattan plans underperforming the New Jersey plans. In that case, the DUET manager 430 would not request a change of plans. However, if the profile store 450 has authorized the DUET manager 430 to request a change in plans when 80% or more of the UEs with Manhattan plans underperformed UEs with the New Jersey plans, the DUET manager 430 can send a service plan change request 490 requesting a change of plans from the business support system (BSS) 405. The BSS 405 underpins commercial activities and handles customer-facing interactions within operations. The BSS 405 includes order capture and management, customer relationship management (CRM), mediation, and charging and billing, as well as call center automation.

The request 490 can also include metadata 495 indicating why the request is being made. The metadata 495 can include the quality of service and the measured parameters indicating that the UE 300 is receiving inferior quality of service compared to the UEs 350, 360. The metadata 495 can also include the historical performance of the UEs having the same service plan 310 and historical performance of the UEs 350, 360 having service plans 355, 365.

The request 490 can have two forms. First, the request 490 can include a request to change the plan for the particular UE 300. Second, the request 490 can include a request to change the plan for all UEs having service plan 310, in the area 320 in FIG. 3. If the second request 490 is approved, the next time a UE having a service plan 310 is in the area 320, the DUET manager 430 does not have to perform the comparative performance analysis 480, and can automatically upgrade the UE to the service plan 355 or 365.

The BSS 405 can automatically determine whether to authorize the request 490 based on a predetermined set of rules. For example, a rule can state that if the utilization level in the area 320 with the service plan 355, 365 is 70%, the BSS 405 can increase the utilization level to 95% or 90%, including UEs whose service plan has been changed to 355, 365. However, if the utilization level goes above 95% or 90%, the BSS 405 does not have the authority to authorize a service plan change, and needs to request the service plan change from an operator such as a person or an artificial intelligence. The utilization level refers to the percentage of UEs utilizing a particular service plan, such as a percentage of UEs in the area 320 with the service plan 355.

The BSS 405 can send service profile update 415 to the profile store 450, authorizing the change of the service plan 310. The profile store 450 can send the service change 425 to the DUET manager 430, which in turn can cause the change of the service plan associated with the UE 300. After changing the service plan associated with the UE 300, the DUET manager 430 can continue to monitor the performance of the UE, can find another plan that is performing better, and consequently can change the service plan associated with the UE 300 to the new plan. For example, the DUET manager 430 can change the service plan from 310 to 355. However, after monitoring the performance of the UE 300 with the service plan 355, the DUET manager 430 can determine that the service plan 365 performs better than the service plan 355. Consequently, the DUET manager 430 can request to change the service plan from 355 to service plan 365.

The DUET manager 430 can revert the service plan of the UE 300 from 355, 365 back to the primary service plan 310 based on various criteria. For example, the DUET manager 430 can revert after a predetermined amount of time, such as one hour, five hours, or a total of 24 hours in a month. In another example, the DUET manager 430 can revert to the service plan 310, after the UE exits the area 320. In a third example, the DUET manager 430 can continue to monitor the quality of service provided to the UE 300, and if the quality of service dips below a predetermined threshold, as described in this application, the DUET manager 430 can revert to the service plan 310.

The device provisioning 435 can deliver configuration data and policy settings to the UE 300 based on service plan changes. For example, if the service plan change includes changing the roaming network, the device provisioning 435 can configure the UE 300 to connect to the new roaming network. In a more specific example, the service plan 310 can configure the UE 300 to detect only specific network 100 components such as components 1, 2, 3. However, the service plan 355, 365 can allow the UE 300 to connect to components 4-10. In that case, the device provisioning 435 can configure the UE 300 to detect and communicate with components 4-10. The components 4-10 can include a roaming network that is different from the roaming network included in the service plan 310.

Figure 5:
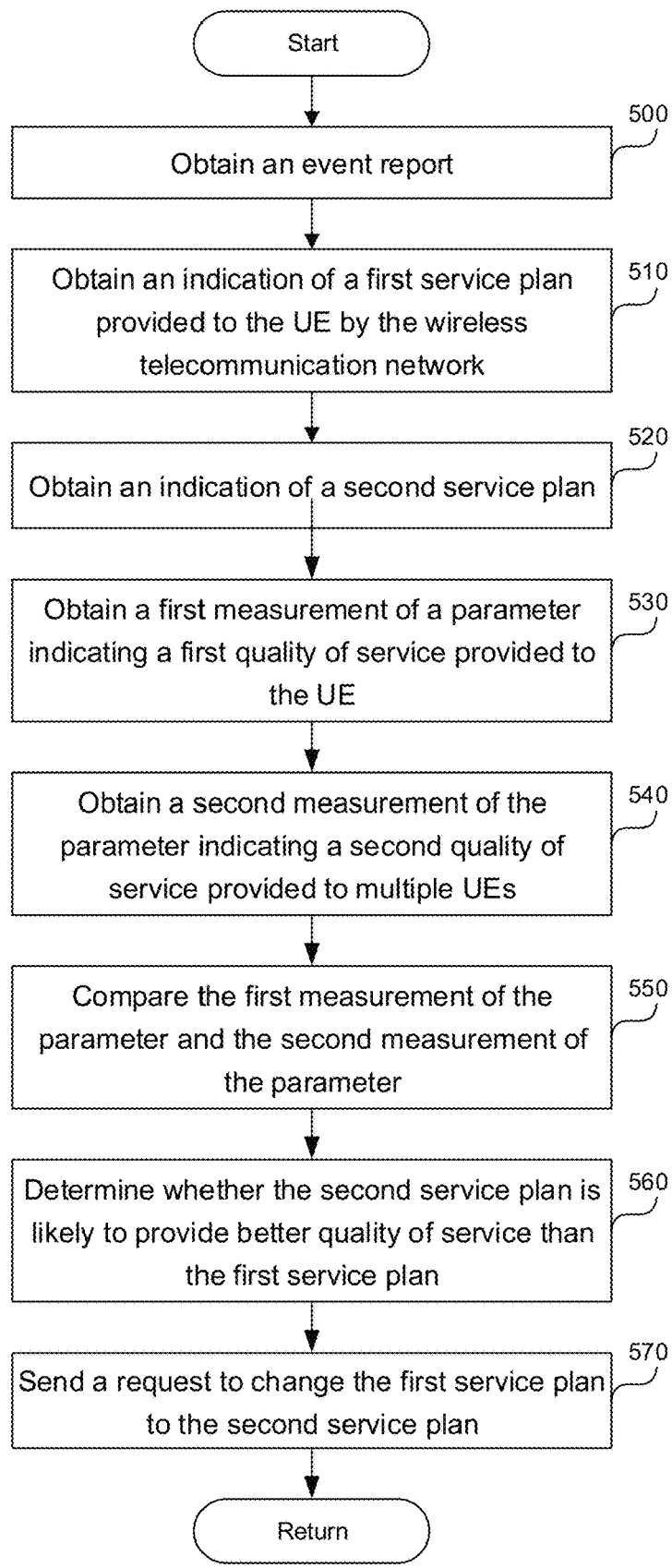
FIG. 5 is a flowchart of a method to dynamically adjust a first service plan provided to a UE by a wireless telecommunication network.

FIG. 5 is a flowchart of a method to dynamically adjust a first service plan provided to a UE by a wireless telecommunication network. A hardware or software processor executing instructions described in this application can, in step 500, obtain an event report. The event report can identify the UE, and indicate a location of the UE.

In step 510, the processor can obtain an indication of a first service plan, e.g., service plan 310, 355, 365 in FIG. 3, provided to the UE by the wireless telecommunication network. In step 520, the processor can obtain an indication of one or more second service plans, where the second service plan is available to the UE at the location of the UE, e.g., location 320 in FIG. 3. The one or more second service plans can vary based on the type of the UE.

In step 530, the processor can obtain a first measurement of a parameter indicating a first quality of service provided to the UE by the wireless telecommunication network. The parameter can be measurement reports, session completion reports, carrier aggregation, signal to interference and noise ratio (SINR), LTE coverage, 5G coverage, frequency division duplex (FDD)/time division duplex (TDD) 5G carrier aggregation, average download speed, etc.

In step 540, the processor can obtain a second measurement of the parameter indicating a second quality of service provided to multiple UEs by the wireless telecommunication network, where the multiple UEs are proximate to the UE, such as within a 100-meter radius.

In step 550, the processor can compare the first measurement of the parameter and the second measurement of the parameter to determine whether the comparison indicates that the first quality of service is lower than the second quality of service.

In step 560, upon determining that the first quality of service is lower than the second quality of service, the processor can determine whether the second service plan is likely to provide better quality of service than the first service plan. The second service plan can be the same as one or more service plans provided to the multiple UEs. The second service plan can include providing 5G coverage to the UE, providing unlimited data, providing virtual private network (VPN) service, or moving the UE to a roaming wireless telecommunication network.

To determine whether the second service plan is likely to provide better quality of service than the first service plan, the processor can perform historical analysis. In one embodiment, the processor can retrieve from a database a historical frequency indicating how frequently a second UE having the first service plan has a lower quality of service than the multiple UEs having the one or more service plans different from the first service plan. The processor can determine whether the historical frequency is statistically significant. To determine whether the historical frequency is statistically significant, the processor can compare the quality of service provided to the UE to a certain threshold. For example, the processor can determine whether 90% of the time the first service plan provides worse service than the service received by 99% of the multiple UEs. Upon determining that the historical frequency is statistically significant, the processor can determine that the second service plan is likely to provide better quality of service than the first service plan. The processor can store the latest measurement of the quality of service in the database.

In another embodiment, the processor can obtain an identifier indicating a technical capability associated with the UE. The identifier can be a Type Allocation Code (TAC) number identifying the manufacturer and model of the device. The TAC is the initial eight-digit portion of the 15-digit IMEI and 16-digit IMEISV codes used to uniquely identify wireless devices. Based on the identifier, the processor can retrieve from a database a historical frequency indicating how frequently changing a second UE from the first service plan to the second service plan improves the quality of service associated with the second UE, where the second UE has the same or similar technical capability as the UE. The processor can determine whether the historical frequency is statistically significant, as explained in the application. Upon determining that the historical frequency is statistically significant, the processor can determine that the second service plan is likely to provide better quality of service than the first service plan. The processor can store the latest measurement of the quality of service in the database.

In step 570, upon determining that the second service plan is likely to provide better quality of service than the first service plan, the processor can send a request to change the first service plan to the second service plan.

The processor can obtain an indication of one or more service plans provided to the multiple UEs by the wireless telecommunication network. Upon determining that the first quality of service is lower than the second quality of service, the processor can determine whether the first service plan is different from the one or more service plans provided to the multiple UEs by the wireless telecommunication network. Upon determining that the first service plan is different from the one or more service plans provided to the multiple UEs, the processor can determine whether the second service plan is likely to provide better quality of service than the first service plan.

The processor can provide an explanation for the requested service plan change. The processor can retrieve from a database a historical frequency indicating how frequently a second UE having the first service plan has a lower quality of service than the multiple UEs having the one or more service plans different from the first service plan. The processor can determine whether the historical frequency is statistically significant, as described in this application. Upon determining that the historical frequency is statistically significant, the processor can create a metadata including the historical frequency and a determination that the historical frequency is statistically significant. The processor can send the metadata and the request to change the first service plan to the second service plan. To prove the request to change the service plan, the processor can automatically perform an analysis based on the rules. The processor can receive an approval to change the first service plan to the second service plan. Consequently, the processor can change the first service plan to the second service plan.

The processor can revert back to the primary plan, e.g., the first plan, after a predetermined period of time. The processor can receive an approval to change the first service plan to the second service plan. The processor can change the first service plan to the second service plan. Upon changing the first service plan to the second service plan, the processor can initiate a timer measuring the amount of time since the change to the second service plan. The processor can obtain a threshold amount of time. The processor can determine whether the amount of time since the change to the second service plan exceeds the threshold amount of time. Upon determining that the amount of time since the change to the second service plan exceeds the threshold amount of time, the processor can revert to the first service plan.

The processor can revert back to the primary plan, e.g., the first plan, after the UE leaves a predetermined area. The processor can receive an approval to change the first service plan to the second service plan. The processor can change the first service plan to the second service plan. The processor can obtain a third measurement of a parameter indicating a third quality of service provided to the UE by the wireless telecommunication network. The processor can obtain a fourth measurement of the parameter indicating a fourth quality of service provided to multiple UEs by the wireless telecommunication network, where the multiple UEs are proximate to the UE. The processor can compare the third measurement of the parameter and the fourth measurement of the parameter to determine whether the comparison indicates that the third quality of service is lower than the fourth quality of service. Upon determining that the third quality of service is lower than the fourth quality of service, the processor can determine whether the first service plan is likely to provide better quality of service than the second service plan. Further, the processor can determine whether the second service plan is the same as one or more service plans provided to the multiple UEs. Upon determining that the first service plan is likely to provide better quality of service than the second service plan, the processor can change the second service plan to the first service plan.

Figure 6:
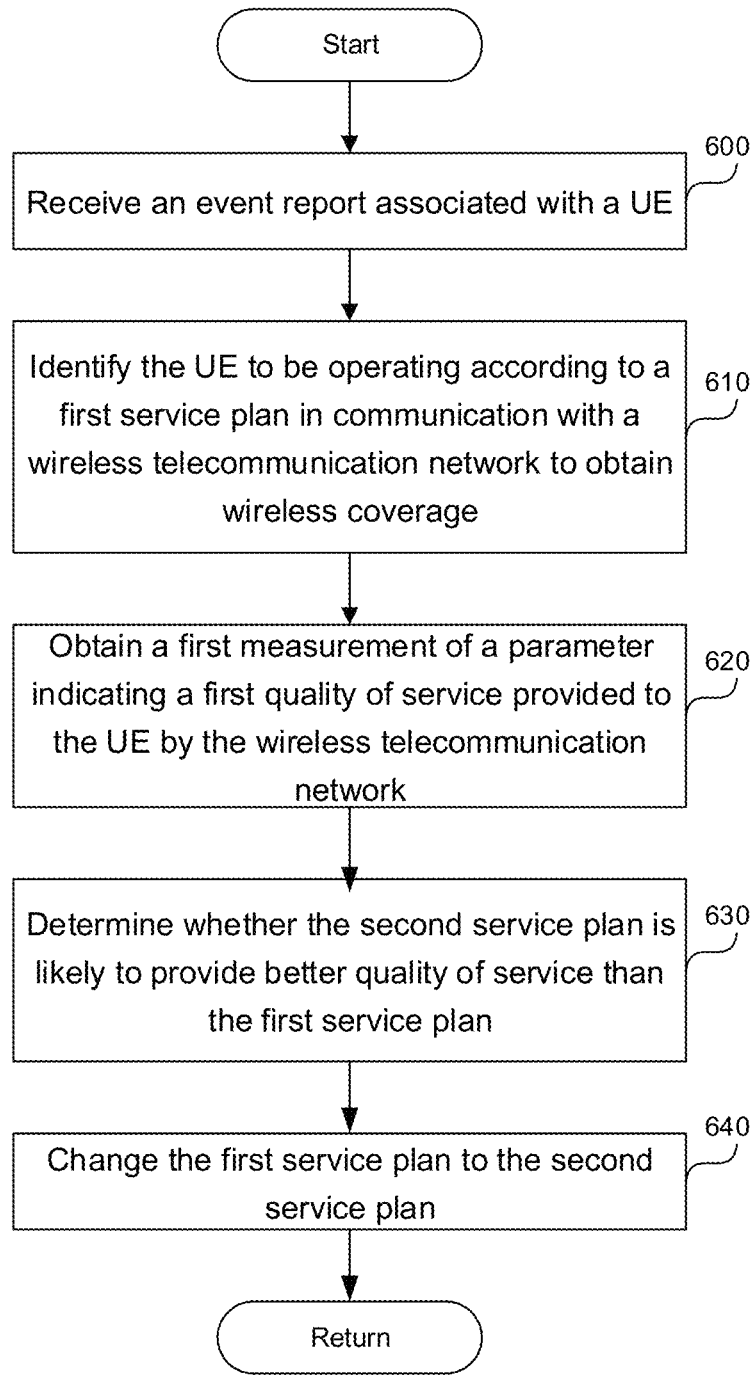
FIG. 6 is a flowchart of a method to revert a service plan provided to the UE to the primary service plan associated with the UE.

FIG. 6 is a flowchart of a method to revert a service plan provided to the UE to the primary service plan associated with the UE. In step 600, the processor can receive an event report associated with a UE, where the event report includes a unique identifier associated with the UE, and a location of the UE. In step 610, based on the unique identifier, the processor can identify the UE to be operating according to a first service plan in communication with a wireless telecommunication network to obtain wireless coverage. The first service plan is different from a second service plan, where the UE has subscribed to communicate with the wireless telecommunication network under the second service plan, and where the telecommunication network has automatically switched the first service plan to the second service plan.

In step 620, the processor can obtain a first measurement of a parameter indicating a first quality of service, as described in this application, provided to the UE by the wireless telecommunication network.

In step 630, the processor can determine whether the second service plan is likely to provide better quality of service than the first service plan. In one embodiment, the processor can retrieve from a database a second measurement of the parameter indicating the second quality of service provided to the UE by the wireless telecommunication network when the UE is using the second service plan. The processor can compare the first measurement and the second measurement. Based on the comparison, the processor can determine that the second service plan is likely to provide better quality of service than the first service plan.

In another embodiment, the processor can retrieve from a database a historical frequency indicating how frequently a second UE having the first service plan has a lower quality of service than multiple UEs having the second service plan. The processor can determine whether the historical frequency is statistically significant. Upon determining that the historical frequency is statistically significant, determine that the second service plan is likely to provide better quality of service than the first service plan. The processor can store the latest measurement in the database.

In step 640, upon determining that the second service plan is likely to provide better quality of service than the first service plan, the processor can change the first service plan to the second service plan.

Computer System

Figure 7:
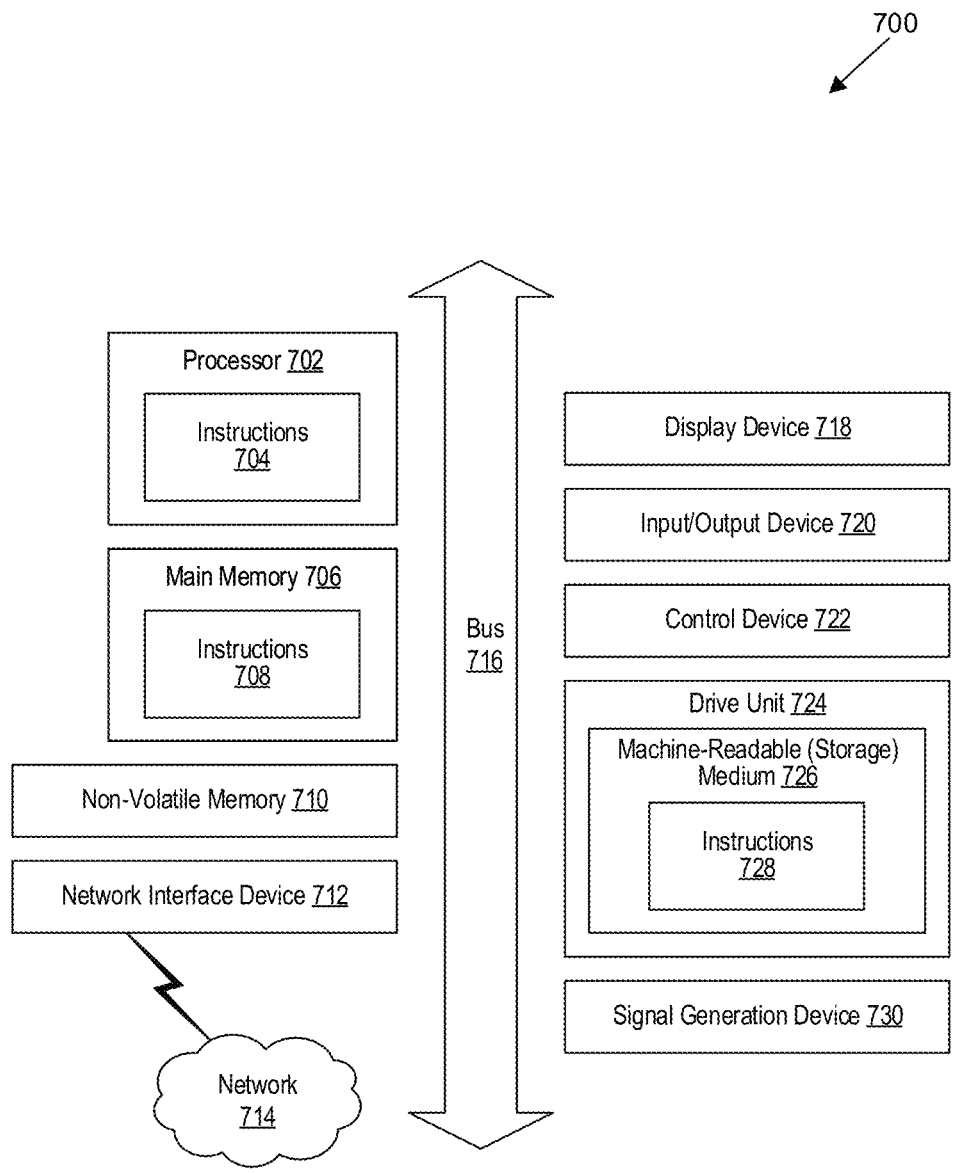
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the Figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, near real time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

I claim:

1. At least one computer-readable storage medium, excluding transitory signals and carrying instructions to dynamically adjust a first service plan provided to a mobile device by a wireless telecommunication network, which, when executed by at least one data processor of a system, cause the system to:
  obtain an event report,
    wherein the event report identifies the mobile device, and
    wherein the event report indicates a geographic location of the mobile device;
  obtain an indication of the first service plan provided to the mobile device by the wireless telecommunication network;
  obtain an indication of a second service plan,
    wherein the second service plan is available to the mobile device at the location of the mobile device;
  obtain a first measurement of a parameter indicating a first quality of service provided to the mobile device by the wireless telecommunication network;
  obtain a second measurement of the parameter indicating a second quality of service provided to multiple mobile devices by the wireless telecommunication network,
    wherein the multiple mobile devices are proximate to the mobile device;
  obtain an indication of one or more service plans provided to the multiple mobile devices by the wireless telecommunication network;
  compare the first measurement of the parameter and the second measurement of the parameter to determine whether the comparison indicates that the first quality of service is lower than the second quality of service;
  upon determining that the first quality of service is lower than the second quality of service, determine whether the first service plan is different from one or more service plans provided to the multiple mobile devices by the wireless telecommunication network;
  upon determining that the first service plan is different from the one or more service plans provided to the multiple mobile devices, determine whether the second service plan is likely to provide better quality of service than the first service plan; and
  upon determining that the second service plan is likely to provide better quality of service than the first service plan, send a request to temporarily change the first service plan to the second service plan.

2. The computer-readable storage medium of claim 1, comprising instructions to:
  retrieve from a database a historical frequency indicating how frequently a second mobile device having the first service plan has a lower quality of service than the multiple mobile devices having the one or more service plans different from the first service plan;
  determine whether the historical frequency is statistically significant; and
  upon determining that the historical frequency is statistically significant, create a metadata including the historical frequency and a determination that the historical frequency is statistically significant; and
  send the metadata and the request to change the first service plan to the second service plan;
  receive an approval to change the first service plan to the second service plan; and
  change the first service plan to the second service plan.

3. The computer-readable storage medium of claim 1, further comprising instructions to determine whether the second service plan is likely to provide better quality of service than the first service plan, comprising instructions to:
  retrieve from a database a historical frequency indicating how frequently a second mobile device having the first service plan has a lower quality of service than the multiple mobile devices having the one or more service plans different from the first service plan;
  determine whether the historical frequency is statistically significant; and
  upon determining that the historical frequency is statistically significant, determine that the second service plan is likely to provide better quality of service than the first service plan.

4. The computer-readable storage medium of claim 1, further comprising instructions to determine whether the second service plan is likely to provide better quality of service than the first service plan, comprising instructions to:
obtain an identifier indicating a technical capability associated with the mobile device;
based on the identifier, retrieve from a database a historical frequency indicating how frequently changing a second mobile device from the first service plan to the second service plan improves a quality of service associated with the second mobile device,
wherein the second mobile device has a similar technical capability as the mobile device;
determine whether the historical frequency is statistically significant; and
upon determining that the historical frequency is statistically significant, determine that the second service plan is likely to provide better quality of service than the first service plan.

5. The computer-readable storage medium of claim 1, further comprising instructions to:
receive an approval to change the first service plan to the second service plan;
change the first service plan to the second service plan;
upon changing the first service plan to the second service plan, initiate a timer measuring an amount of time since the change to the second service plan;
obtain a threshold amount of time;
determine whether the amount of time since the change to the second service plan exceeds the threshold amount of time; and
upon determining that the amount of time since the change to the second service plan exceeds the threshold amount of time, revert to the first service plan.

6. The computer-readable storage medium of claim 1, further comprising instructions to:
receive an approval to change the first service plan to the second service plan;
change the first service plan to the second service plan;
obtain a third measurement of the parameter indicating a third quality of service provided to the mobile device by the wireless telecommunication network;
obtain a fourth measurement of the parameter indicating a fourth quality of service provided to a second multiplicity of mobile devices by the wireless telecommunication network,
wherein the second multiplicity of mobile devices are proximate to the mobile device;
compare the third measurement of the parameter and the fourth measurement of the parameter to determine whether the comparison indicates that the third quality of service is lower than the fourth quality of service;
upon determining that the third quality of service is lower than the fourth quality of service, determine whether the first service plan is likely to provide better quality of service than the second service plan; and
upon determining that the first service plan is likely to provide better quality of service than the second service plan, change the second service plan to the first service plan.

7. The computer-readable storage medium of claim 1, wherein the second service plan includes providing 5G coverage to the mobile device, providing unlimited data, providing virtual private network (VPN) service, or moving the mobile device to a roaming wireless telecommunication network.

8. A system comprising:
at least one hardware processor; and
at least one non-transitory memory storing instructions, which, when executed by the at least one hardware processor, cause the system to:
obtain a report,
wherein the report identifies a user equipment (UE), and
wherein the report indicates a location of the UE;
obtain an indication of a first service plan provided to the UE by a wireless telecommunication network;
obtain an indication of a second service plan,
wherein the second service plan is available to the UE at the location of the UE;
obtain a first measurement of a parameter indicating a first quality of service provided to the UE by the wireless telecommunication network;
obtain a second measurement of the parameter indicating a second quality of service provided to multiple UEs by the wireless telecommunication network,
wherein the multiple UEs are proximate to the UE;
determine whether the second service plan is likely to provide better quality of service than the first service plan based on a determination that the first quality of service is lower than the second quality of service; and
upon determining that the second service plan is likely to provide better quality of service than the first service plan, instituting a change from the first service plan to the second service plan.

9. The system of claim 8, comprising instructions to:
obtain an indication of one or more service plans provided to the multiple UEs by the wireless telecommunication network;
upon determining that the first quality of service is lower than the second quality of service, determine whether the first service plan is different from the one or more service plans provided to the multiple UEs by the wireless telecommunication network; and
upon determining that the first service plan is different from the one or more service plans provided to the multiple UEs, determine whether the second service plan is likely to provide better quality of service than the first service plan.

10. The system of claim 8, comprising instructions to:
retrieve from a database a historical frequency indicating how frequently a second UE having the first service plan has a lower quality of service than the multiple UEs having one or more service plans different from the first service plan;
determine whether the historical frequency is statistically significant; and
upon determining that the historical frequency is statistically significant, create a metadata including the historical frequency and a determination that the historical frequency is statistically significant; and
send the metadata and the request to change the first service plan to the second service plan;
receive an approval to change the first service plan to the second service plan; and
change the first service plan to the second service plan.

11. The system of claim 8, instructions to determine whether the second service plan is likely to provide better quality of service than the first service plan, comprising instructions to:
retrieve from a database a historical frequency indicating how frequently a second UE having the first service plan has a lower quality of service than the multiple UEs having one or more service plans different from the first service plan;
determine whether the historical frequency is statistically significant; and
upon determining that the historical frequency is statistically significant, determine that the second service plan is likely to provide better quality of service than the first service plan.

12. The system of claim 8, instructions to determine whether the second service plan is likely to provide better quality of service than the first service plan, comprising instructions to:
obtain an identifier indicating a technical capability associated with the UE;
based on the identifier, retrieve from a database a historical frequency indicating how frequently changing a second UE from the first service plan to the second service plan improves a quality of service associated with the second UE, wherein the second UE has a similar technical capability as the UE;
determine whether the historical frequency is statistically significant; and
upon determining that the historical frequency is statistically significant, determine that the second service plan is likely to provide better quality of service than the first service plan.

13. The system of claim 8, comprising instructions to:
receive an approval to change the first service plan to the second service plan;
change the first service plan to the second service plan;
upon changing the first service plan to the second service plan, initiate a timer measuring an amount of time since the change to the second service plan;
obtain a threshold amount of time;
determine whether the amount of time since the change to the second service plan exceeds the threshold amount of time; and
upon determining that the amount of time since the change to the second service plan exceeds the threshold amount of time, revert to the first service plan.

14. The system of claim 8, comprising instructions to:
receive an approval to change the first service plan to the second service plan;
change the first service plan to the second service plan;
obtain a third measurement of the parameter indicating a third quality of service provided to the UE by the wireless telecommunication network;
obtain a fourth measurement of the parameter indicating a fourth quality of service provided to a second multiplicity of UEs by the wireless telecommunication network,
wherein the second multiplicity of UEs are proximate to the UE;
compare the third measurement of the parameter and the fourth measurement of the parameter to determine whether the comparison indicates that the third quality of service is lower than the fourth quality of service;
upon determining that the third quality of service is lower than the fourth quality of service, determine whether the first service plan is likely to provide better quality of service than the second service plan; and
upon determining that the first service plan is likely to provide better quality of service than the second service plan, change the second service plan to the first service plan.

15. The system of claim 8, wherein the second service plan includes providing 5G coverage to the UE, providing unlimited data, providing virtual private network (VPN) service, or moving the UE to a roaming wireless telecommunication network.

16. A system comprising:
at least one hardware processor; and
at least one non-transitory memory storing instructions, which, when executed by the at least one hardware processor, cause the system to:
receive a report associated with a UE
wherein the report includes a unique identifier associated with the UE, and
wherein the report indicates a location of the UE;
based on the unique identifier, identify the UE to be operating according to a first service plan in communication with a wireless telecommunication network to obtain wireless coverage,
wherein the first service plan is different from a second service plan,
wherein the UE has subscribed to communicate with the wireless telecommunication network under the second service plan,
wherein the wireless telecommunication network has automatically switched the first service plan to the second service plan;
obtain a first measurement of a parameter indicating a first quality of service provided to the UE by the wireless telecommunication network;
determine whether the second service plan is likely to provide better quality of service than the first service plan; and
upon determining that the second service plan is likely to provide better quality of service than the first service plan, change the first service plan to the second service plan.

17. The system of claim 16, instructions to determine whether the second service plan is likely to provide better quality of service than the first service plan, comprising instructions to:
retrieve from a database a second measurement of the parameter indicating a second quality of service provided to a second UE by the wireless telecommunication network when the second UE is using the second service plan;
compare the first measurement and the second measurement; and
based on the comparison, determine that the second service plan is likely to provide better quality of service than the first service plan.

18. The system of claim 16, instructions to determine whether the second service plan is likely to provide better quality of service than the first service plan, comprising instructions to:
retrieve from a database a historical frequency indicating how frequently a second UE having the first service plan has a lower quality of service than multiple UEs having the second service plan;
determine whether the historical frequency is statistically significant; and
upon determining that the historical frequency is statistically significant, determine that the second service plan is likely to provide better quality of service than the first service plan.

19. The system of claim 16, instructions to determine whether the second service plan is likely to provide better quality of service than the first service plan, comprising instructions to:
- obtain an identifier indicating a technical capability associated with the UE;
- based on the identifier, retrieve from a database a historical frequency indicating how frequently changing a second UE from the first service plan to the second service plan improves a quality of service associated with the second UE, wherein the second UE has a similar technical capability as the UE;
- determine whether the historical frequency is statistically significant; and
- upon determining that the historical frequency is statistically significant, determine that the second service plan is likely to provide better quality of service than the first service plan.

20. The system of claim 16, wherein the second service plan includes providing 5G coverage to the UE, providing unlimited data, providing virtual private network (VPN) service, or moving the UE to a roaming wireless telecommunication network.

* * * * *